United States Patent
Mohr et al.

[11] Patent Number: 6,105,353
[45] Date of Patent: *Aug. 22, 2000

[54] PLANETARY TRANSMISSION FOR BALER

[75] Inventors: Jan-Hendrik Mohr, Wuennenberg-Haaren; Ralf Koenig, Harsewinkel, both of Germany

[73] Assignee: Claas KGaA, Harsewinkel, Germany

[*] Notice: This patent is subject to a terminal disclaimer.

[21] Appl. No.: 09/251,973

[22] Filed: Feb. 17, 1999

Related U.S. Application Data

[63] Continuation-in-part of application No. 08/858,527, May 19, 1997.

[30] Foreign Application Priority Data

May 28, 1997 [DE] Germany ............... 196 21 391

[51] Int. Cl.[7] ............................................. A01D 39/00
[52] U.S. Cl. ..................... 56/341; 475/2; 475/153; 56/434
[58] Field of Search ..................... 475/2–5, 149, 475/153; 56/341, 434; 100/88

[56] References Cited

U.S. PATENT DOCUMENTS

| | | | |
|---|---|---|---|
| 4,112,311 | 9/1978 | Theyse | 475/2 |
| 4,423,794 | 1/1984 | Beck | 475/149 X |
| 4,514,991 | 5/1985 | Zinsmeyer | 475/2 X |
| 4,686,378 | 8/1987 | Sisk | 475/2 |
| 4,973,295 | 11/1990 | Lee | 475/153 |
| 5,039,281 | 8/1991 | Johnston | 475/2 |
| 5,894,718 | 4/1999 | Hawlas et al. | 56/341 |
| 5,947,854 | 9/1999 | Kopko | 475/153 X |

*Primary Examiner*—Khoi Q. Ta
*Attorney, Agent, or Firm*—Michael J. Striker

[57] ABSTRACT

A baler for agricultural products has a chassis, a pickup, a transporting passage, a pressing chamber, a binding device, a discharging device, a working element performing working operations in the baler, a main drive shaft connected with the working element for driving the working means, at least one planetary summing transmission connected with an operative for driving the main drive shaft, a first drive unit including a cardan shaft and transmitting rotation with a first rotary speed to the planetary summing transmission, and a second drive unit transmitting a rotation to the planetary summing transmission with a second regulatable rotary speed, so that the planetary summing transmission summarizes the rotary speeds of the first and second drive units and produces a rotation with an output speed for driving the main drive shaft.

11 Claims, 4 Drawing Sheets

PLANETARY TRANSMISSION FOR BALER

CROSS-REFERENCE TO A RELATED APPLICATION

This application is a continuation-in-part of patent application Ser. No. 08/858,527 filed on May 19, 1997.

BACKGROUND OF THE INVENTION

The present invention relates to a baler for agricultural products.

Balers of this type are known in the art. A drive diagram of such a baler is disclosed for example in the German patent document DE 36 38 792. This document shows an agricultural baler with a pickup, a transporting passage, a pressing chamber. A binding and discharging device, as well as movably driven feeding and pressing elements including the associated drive. The baler in the practical use is suspended on a field tractor and driven from a power take-off of the tractor. A cardan shaft is connected with it, and the drive forces are distributed from the carden shaft to the driving machine elements through a main transmission range in the baler. The drives of the baler are therefore provided with a constant rotary speed of the power take-off shaft of 1,000 revolutions per minute.

It has been found in practice that the power take-offs of some tractors can not maintain the predetermined rotary speed, which leads either to a low power of the baler when the nominal rotary speed is not reached, or to an excessive overloading of the drive elements when the nominal rotary speed is exceed. Moreover, it is also disadvantageous that always only a few teeth or the same teeth in the main transmission transmit the drive load. In particular, during load picks high forces act on these teeth. The teeth must be designed for such high forces, and despite this a certain wear occurs. For providing a uniform wear of the teeth, during maintenance work it is necessary to turn the main drive shaft relative to the remaining derives, which is connected with considerable labor expenses. An additional disadvantage is the great structural volume of the main transmission, which is needed to take up occurring forces. A further disadvantage is that in the known drive concept for balers allows no reversing.

SUMMARY OF THE INVENTION

Accordingly, it is an object of the present invention to provide baler for agricultural products, which avoids the disadvantages of the prior art.

More particularly, it is an object of the present invention to provide a drive of a baler which is designed so that it maintains a substantially constant rotary speed, the teeth of the main transmission are uniformly loaded, and a small structural size of the main transmission is possible.

Moreover, if it is desirable, a reversing of the drive in the case of stoppages can be performed.

In keeping with these objects and with others which will become apparent hereinafter, one feature of present invention resides, briefly stated, in a baler for agricultural products, in which the drive train of the movable driving feeding and/or pressing elements of the baler at least one planetary summing transmission is arranged.

Such a planetary summing transmission provides the advantage that it can compensate rotary speed differences. With the use of several planetary gears, the drive force is transmitted not through a toothed gear pair, but instead through the teeth of the several planetary gears. The distribution of the drive forces to be transmitted through several planetary gears makes possible small dimensioning and therefore small total dimensions of the main transmission.

In accordance with a preferable embodiment of the present invention, the first stage of the planetary summing transmission is driveable from a cardan shaft connected with the power take-off shaft, and the second stage is driveable from a second drive, such as for example an electric or hydraulic motor. In the case of the switching-off of the power take-off shaft, in this arrangement it is possible to compensate not only the rotary speed difference, but also depending on the control of the second axis, to reverse the whole drive train in the case of for example clogging or maintenance works.

For easy accommodation of the planetary summing transmission in available mounting space, it is advantageous to arrange a bevel gear transmission directly before or after the planetary summing transmission, in order to orient the main transmission shaft transversely to the traveling direction of the baler.

Diameter and teeth of the toothed gears can be selected so that the main drive shaft can reach a rotary speed of substantially 50revolutions per minute when the second drive is stopped and a rotary speed of the power take-off shaft is approximately 1000 revolutions per minute. In such a design, it is avoided that in the normal case with correct rotary number of the power take-off shaft of the tractor, energy for driving the second drive is wasted. However, when a hydraulic motor is used as the second drive source it is noted that at a low rotary speed it has a pour efficiency, and therefore another design can be considered.

It can be advantageous when a uniform loading is obtained by a rotatable hollow gear. A favorable combination is provided when the first drive acts through a hollow shaft on the sun gear and the second drive acts on the hollow gear, and the planetary transmission is in engagement with both and is connected through a web or a planetary gear carrier with the main drive shaft for joint rotation.

Drive energy can be transmitted to subsequent movably driven feeding, pressing and/or binding elements from the first hollow shaft on which the first drive acts through at least one toothed gear connected with the hollow shaft for joint rotation or through another drive element, for example belt or screw drive element. Instead of the hollow shaft, the derive energy can be also transmitted for the subsequent elements from the main drive shaft, depending on the objectives.

In accordance with a further embodiment of the invention, the planetary summing transmission is regulated by a central electric system. The input and output rotary speeds are detected by rotary speed sensors, compared with nominal values, and in the case of the differences a control signal is transmitted to the second drive by which the determined rotary speed difference must be compensated. The control electric system can be designed so that it regulates the output rotary speed of the main drive shaft to a preselected value.

The control electric system can however regulate the planetary summing transmission in accordance with a characteristic line. The characteristic lines can be load-dependent. In correspondence with this, the control electronic system can for example reduce the output speed when a lower load is determined by a corresponding sensor unit, to select sufficient material for a good passage feeling with the same forward speed. Depending on the design of the machine the rotary speed can however be increased. When the loading is too high, the rotary speed can be reduced to allow the driver to lower the speed. The control electronic system must be connected through a CAN-bus system with the electronic system of the baler, and the functions of the control electronic system can be controllable through an operator box located in the driver's cabin of the tractor.

The present invention can be used not only with the illustrated pulled large baler, but also in pulled round balers, compact roller balers and high pressure baler and corresponding self-propelling devices as well.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
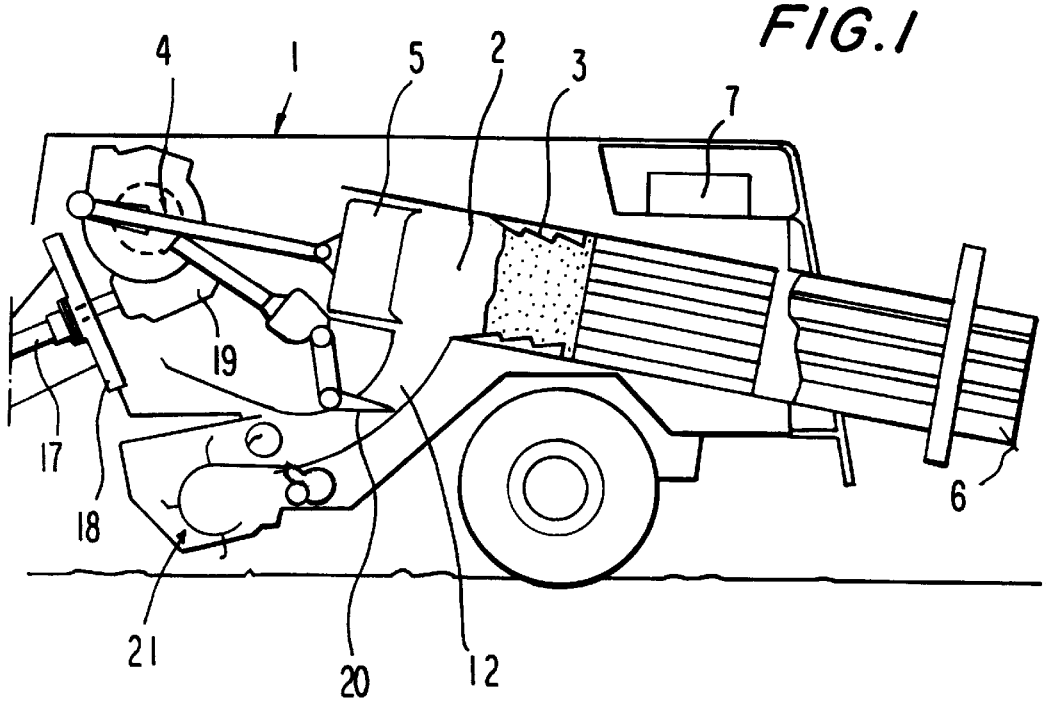
FIG. 1 is a side view of a baler which is known from a prior art.

A baler 1 shown in FIG. 1 has a pressing passage 2. A harvested product 3 is compacted and transported forwardly in direction toward the outlet of the pressing passage 2 by a pressing piston 5 which is oscillatingly driven from a crank drive 4. The finished bales leaves the baler at the output end 6. A binding device 7 with associated binding needles are not shown in detail. The drive of the baler shown in FIG. 1 corresponds to the prior art. The baler is driven from a not shown tractor through a cardan shaft 17. For supplying a rotary energy which is outputted again during peak loads, it is provided with a flywheel 18. The cardan shaft 17 is drivingly coupled with a drive block 19 in a not shown manner. The drive forces are transmitted from the drive block 19 for a crank unit 4, for feed rakes 20 which displace the harvested product through a supply passage 12, for a pickup drum 21 as well as for further aggregates, such as for example the binding device with binding needles, a cutting device, etc.

Figure 2:
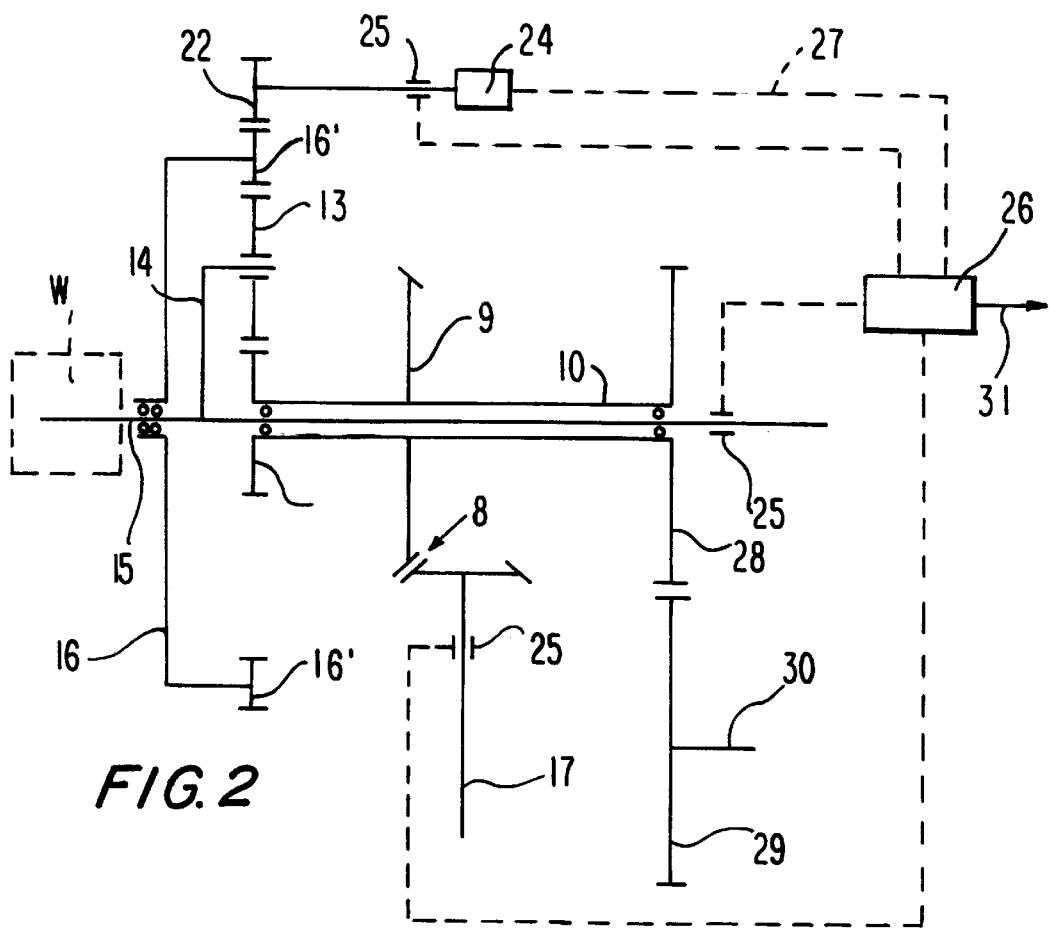
FIG. 2 is a drive diaphragm of a drive train of the baler in accordance with the present invention.

FIG. 2 shows an example of a transmission block 19 in accordance with the present invention which is different from the transmission block of the prior art baler shown in FIG. 1. A main drive shaft is connected with working means W of the baler. The cardan shaft 17 transmits a rotary movement coming from a first drive through a bevel gear transmission 8 to a toothed gear 9 which is fixedly connected with a hollow shaft 10 for joint rotation with it. The hollow shaft 10 transmits the rotary movement to a sun gear 11 which is also connected with it for joint rotation and which engages with several, for example three planetary gears 13. With the use of several planetary gears 13 which are in engagement with the sun gear 11, the drive load is carried simultaneously by several teeth of the several planetary gears 13. Constantly new engagement positions of the teeth make possible additionally a reduction of the required mounting space. The toothed gears are loaded uniformly. When compared with the conventional drives, the teeth of the planetary gears 13 and the sun gear 11 can be made smaller with the same input torque, or made of the same size3 with a greater transmitting torque. The smaller transition modules with lower axial distances lead to a higher power density.

The planetary transmission can be further reinforced by the use of additional planets. Therefore, the possibility arises to reduce the mounting size of the transmission with the same transmission torque. A reverse planetary transmission, or in other words a planetary transmission with a coaxial position of the connecting shafts is more compact than the forward transmission. The planetary gears 13 are fixedly connected with the main drive shaft 15 through the web or the planetary carrier 14 for joint rotation with the main derive shaft. In addition to the sun gear 11, the planetary gears 13 are also in an engagement with a hollow gear 16 which is arranged hollow gear 16 is driven in rotation through a toothed gear 22 from a second drive 24.

The interengagement of the corresponding elements is as follows. The sun gear 11 meshes with the planetary gears 13 which are rotatably fixed on the shafts of the planetary carrier 14, and the latter is rigidly connected to the main drive shaft 15. The planetary gears 13 also mesh with the inner teeth of the toothed ring 16' which is fixed to the hollow shaft 16. The outer teeth of the toothed ring 16' of the hollow shaft 16 mesh with the toothed gear 22 which is driven by the second drive unit 24. The planetary gears may be one or more toothed gears with a respective planetary carrier for each planetary gear. The hollow shaft 10 and 16 rotate on bearings of the main drive shaft 15.

As a whole, the planetary summing transmission summarizes the inlet rotary speeds of the first and second drives to an output rotary speed of the main drive shaft 15. In order to obtain a desired rotary speed of the main drive 15, the rotary speed of the toothed gear 22 which is loaded from the second drive 24 must be variable at the constant rotary speed of the cardan shaft 17. In order to achieve this, the second drive 24 must have a regulatable rotary speed. This is possible in a simple and known manner with the use of an electric motor or a hydraulic motor.

A control electronic system 28 determines, via rotary speed sensors 25, the rotary speed of the main drive shaft 15, optionally also the rotary of the toothed gear 22 or the second drive 24 and also of the cardan shaft 17. During a comparison of the actual rotary speed of the main drive shaft 15 with a predetermined nominal value the control electronic system 26 determines a difference, and extends through a conductor 27 an adjusting command to the second drive 24 which must compensate the difference, so that then again the nominal and actual values of the main drive shaft 15 are compared with one another. In this way a continuous rotary speed regulation is provided.

The control electronic system 26 is connected through a conductor with the remaining electronic system of the baler (sensor units and actual units) as well as with the tractor and exchange through this conductor signal informations, such as indication values, adjustment commands, control signals etc. When a tractor is also equipped with a regulator device for controlling the rotational speed of the cardan shaft 17 (power take-off), it is possible that both electronic control systems are coordinating themselves in a way that the second drive unit 24 is scarcely even switched on. The rotary speed regulations can be however optimized also to other values. Depending on the design of the second drive 24 and the tooth number in the planetary summing transmission 23, the control electronic system 26 can be switched off to a reversing command through the conductor 31 or the power pickup shaft, and the second drive 24 can be controlled through the conductor so that it produces a reversing rotary speed of the main drive shaft 15.

Figure 3:
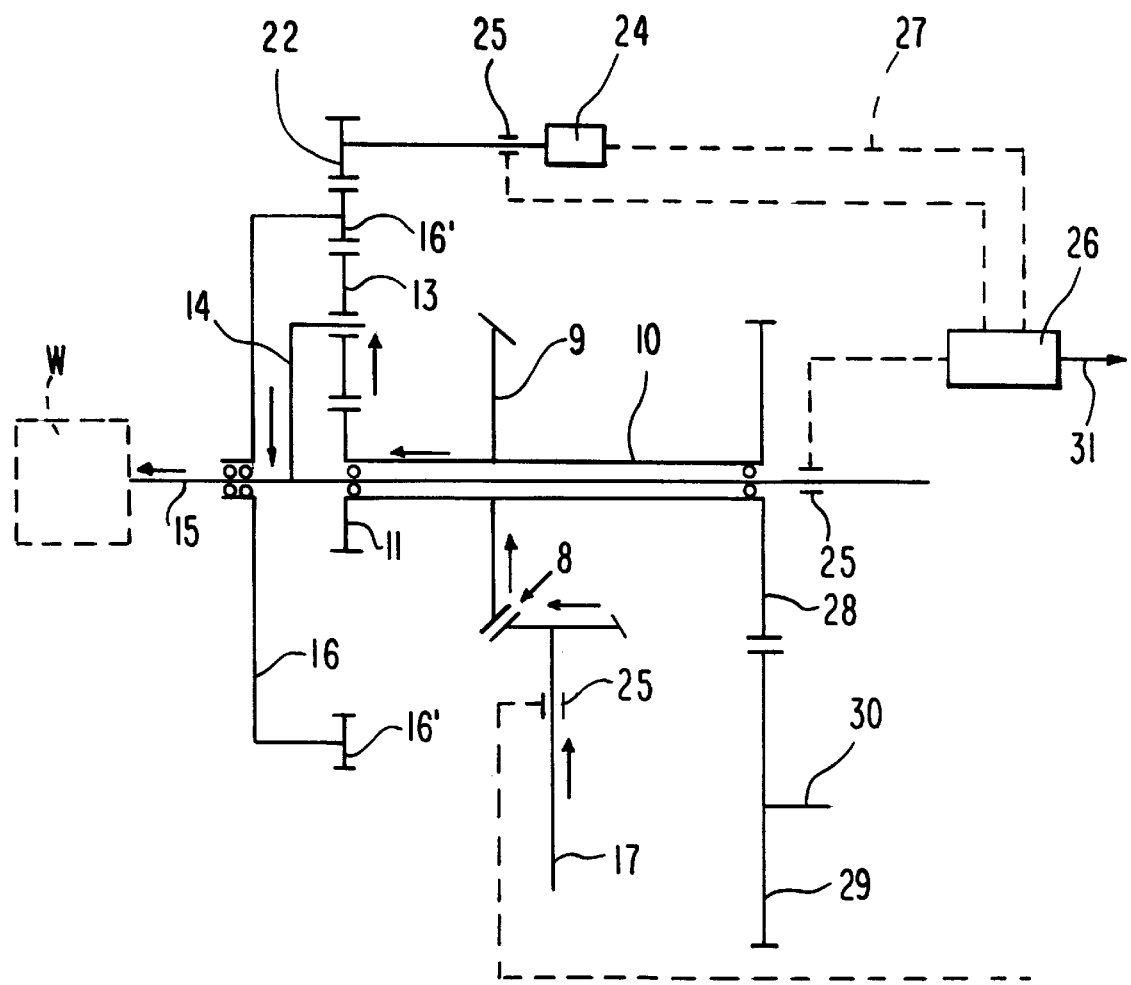
FIG. 3 is a view showing the drive train of the inventive baler in a first operating condition, in which power is transmitted only from a first drive unit.

The power drive of the bale in accordance with the present invention therefore has three operating conditions. In the first operating condition the power is only transmitted from the first drive. The second drive 24 is switched off, and the hollow gear 16 as well as the toothed gear 22 are at a standstill. The toothed gear 9 is driven by the cardan shaft 17 and is rotating, the wheels 9 and 11 are both arranged on the hollow shaft 10 and jointly rotate, and the planetary gears 13 are rotated to move the planetary carrier 14, which transmits the rotation to the main drive shaft 15, as shown in FIG. 3.

Figure 4:
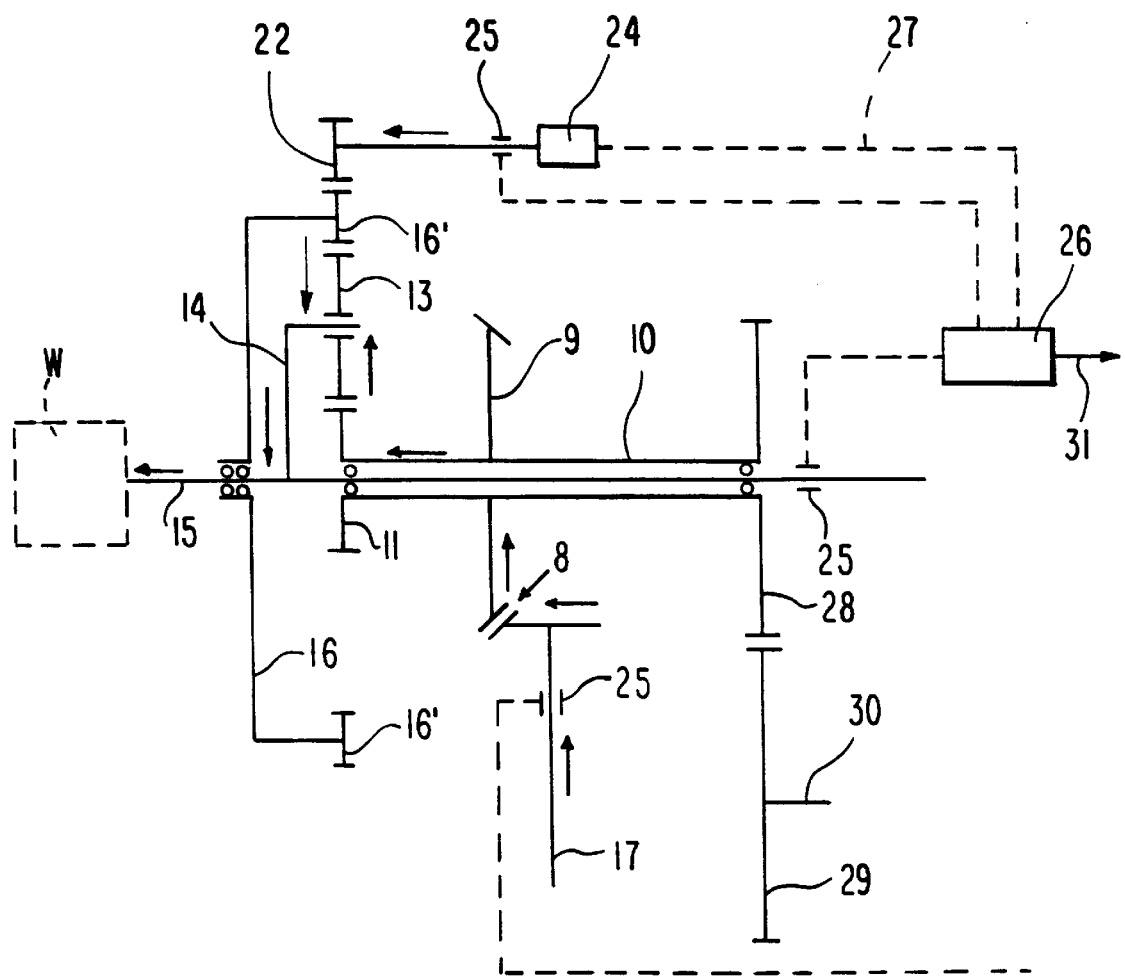
FIG. 4 is a view showing a drive train of the inventive baler in a second operating condition, in which power is transmitted from both drive units.
Figure 5:
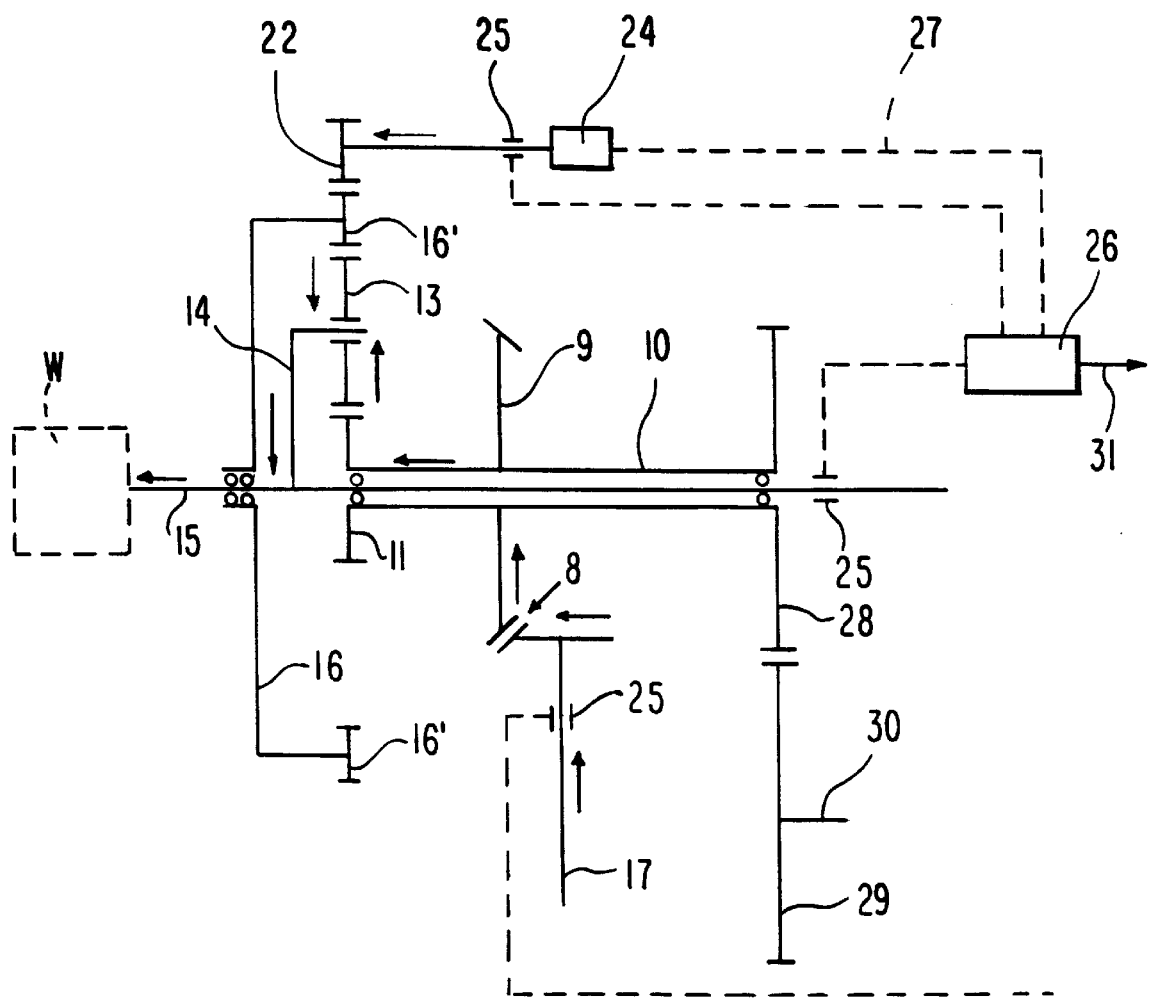
FIG. 5 is a view showing a drive train of the baler in a third operating condition, in which power is transmitted only from a second drive unit.

In the second operating condition the power is transmitted from both drives. The sun gear 11 is rotatingly driven by the first drive unit, and the toothed ring 16' is driven by the second drive unit, and both rotational movements are transmitted by the planetary gears 13 to the planetary carrier 14 and thereby to the main drive shaft 15 as shown in FIG. 4.

In the third operating condition the cardan shaft 17 and the gears 9 and 11 are at a standstill. The second drive 24 drives rotationally the gear 22, and this rotation is transmitted through the gears 13 to the planetary carrier 14, and further to the main drive shaft 15.

In addition to the drive shaft 15 regulated through the planetary summing transmission, it is also possible to transmit a rotary movement to the toothed gear 29 connected with the shaft 20 for joint rotation with it, through the bevel gear transmission 8 or through the toothed gear 28 connected wit the hollow shaft 10. Since the rotary movements are taken out from the summing by the planetary summing transmission, they are constantly proportional to the rotary speed of the cardan shaft. In this way such elements can be driven which must run not synchronously to the elements driven by the main drive shaft 15.

The embodiment shown in FIG. 2 is only exemplary. A person skilled in the art will have no difficulties in configuration of other combinations of a planetary summing transmission to obtain the advantages of the present invention. The simplified diagram shown in FIG. 2 can be completed without difficulties by a person skilled in the art with other known drive components, such as shear pins, turning-off couplings, lubricating means, transmission housing, etc.

It will be understood that each of the elements described above, or two or more together, may also find a useful application in other types of constructions differing from the types described above.

While the invention has been illustrated and described as embodied in baler for agricultural products, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A baler for agricultural products, comprising a chassis; a pickup; a transporting passage; a pressing chamber; a binding device; a discharging device; working means performing working operations in the baler; a main drive shaft connected with said working means for driving said working means; at least one planetary summing transmission connected with and an operative for driving said main drive shaft; a first drive unit including a cardan shaft and transmitting rotation with a first rotary speed to said planetary summing transmission; and a second drive unit transmitting a rotation to said planetary summing transmission with a second regulatable rotary speed, so that said planetary summing transmission summarizes said rotary speeds of said first and second drive units and produces a rotation with an output speed for driving said main drive shaft.

2. A baler as defined in claim 1; and further comprising a bevel gear transmission connecting said carden shaft and said planetary summing transmission.

3. A baler as defined in claim 1; and further comprising a power pickup shaft, said planetary summing transmission being provided with a plurality of toothed gears with a diameter and a number of teeth selected so that when said second drive unit is stopped and a rotary speed of said power pickup shaft is 1000 revolutions per minute, said main drive shaft has a rotary speed of 50 revolutions per minute.

4. A baler as defined in claim 1; and further comprising control electronic means which regulate said planetary summing transmission.

5. A baler as defined in claim 4, wherein said control electronic means is formed so that it regulates an output rotary speed of said main drive shaft to a pre-selected value.

6. A baler as defined in claim 4, wherein said control electronic means is formed so that it regulates an output rotary speed and compare nominal values which are stored in a memory with actual values determined by sensor means.

7. A baler for agricultural products, comprising a chassis; a pickup; a transporting passage; a pressing chamber; a binding device; a discharging device; working means performing working operations in the baler; a main drive shaft connected with said working means for driving said working means; at least one planetary summing transmission connected with and an operative for driving said main drive shaft; a first drive unit including a cardan shaft and transmitting rotation with a first rotary speed to said planetary summing transmission; and a second drive unit transmitting a rotation to said planetary summing transmission with a second regulatable rotary speed, so that said planetary summing transmission summarizes said rotary speeds of said first and second drive units and produces a rotation with an output speed for driving said main drive shaft, said planetary summing transmission having a sun gear and a plurality of planetary gears; a hollow shaft arranged so that said first drive unit acts on said sun gear through said hollow shaft; a hollow gear arranged so that said second drive acts on said hollow gear; and an intermediate member through which said planetary gears are connected with said main drive shaft for joint rotation with the latter.

8. A baler as defined in claim 7, wherein said intermediate member is formed as a web.

9. A baler as defined in claim 7, wherein said intermediate element is formed as a planetary gear carrier.

10. A baler as defined in claim 7; and further comprising a further drive member through which drive energy is transmitted from said hollow shaft to said working means.

11. A baler as defined in claim 10, wherein said further drive member is formed as at least one further toothed gear which is connected with said hollow shaft for joint rotation with the said hollow shaft.

\* \* \* \* \*